(12) United States Patent
Schultheiss et al.

(10) Patent No.: US 7,710,328 B2
(45) Date of Patent: May 4, 2010

(54) PATCH ANTENNA WITH A CERAMIC PLATE AS A COVER

(75) Inventors: Daniel Schultheiss, Hornberg (DE); Juergen Motzer, Gengenbach (DE); Josef Fehrenbach, Haslach (DE)

(73) Assignee: Vega Grieshaber KG, Wolfach (DE)

( * ) Notice: Subject to any disclaimer, the term of this patent is extended or adjusted under 35 U.S.C. 154(b) by 431 days.

(21) Appl. No.: 11/737,446

(22) Filed: Apr. 19, 2007

(65) Prior Publication Data

US 2007/0279309 A1 Dec. 6, 2007

Related U.S. Application Data (60) Provisional application No. 60/795,618, filed on Apr. 27, 2006.

(30) Foreign Application Priority Data

Apr. 27, 2006 (DE) .................. 10 2006 019 688

(51) Int. Cl.
*H01Q 1/38* (2006.01)
(52) U.S. Cl. ............................. 343/700 MS
(58) Field of Classification Search ......... 343/700 MS, 343/702, 784–786, 789
See application file for complete search history.

(56) References Cited

U.S. PATENT DOCUMENTS

| | | | |
|---|---|---|---|
| 5,406,842 | A | 4/1995 | Locke |
| 5,507,181 | A | 4/1996 | Fox et al. |
| 6,275,192 | B1 * | 8/2001 | Kim .................. 343/700 MS |
| 6,353,443 | B1 * | 3/2002 | Ying ......................... 715/702 |
| 6,661,389 | B2 * | 12/2003 | Griessbaum et al. ........ 343/786 |
| 6,891,513 | B2 | 5/2005 | Kienzle et al. |
| 6,919,862 | B2 * | 7/2005 | Hacker et al. ............... 343/909 |
| 7,173,436 | B2 | 2/2007 | Edvardsson |
| 7,372,419 | B2 * | 5/2008 | Kim et al. .................. 343/776 |
| 2003/0151560 | A1 | 8/2003 | Kienzle et al. |
| 2003/0201946 | A1 | 10/2003 | Sheen |

FOREIGN PATENT DOCUMENTS

| | | |
|---|---|---|
| DE | 44 31 886 | 5/1995 |
| DE | 198 00 306 | 7/1999 |
| EP | 0 884 567 | 12/1998 |
| EP | 1 488 959 | 8/2004 |
| WO | 03/098168 | 11/2003 |
| WO | 2006/057599 | 6/2006 |

* cited by examiner

*Primary Examiner*—Huedung Mancuso
(74) *Attorney, Agent, or Firm*—Fay Kaplun & Marcin, LLP (57) ABSTRACT

Described is a planar antenna with a process separation device for a fill level radar. The planar antenna including a plate-shaped temperature-resistant process separation device that is arranged between the planar radiator element and the exterior of the antenna.

18 Claims, 5 Drawing Sheets

PATCH ANTENNA WITH A CERAMIC PLATE AS A COVER

REFERENCE TO RELATED APPLICATIONS

This application claims the benefit of the filing date of German Patent Application Serial No. 10 2006 019 688.0 filed Apr. 27, 2006 and U.S. Provisional Patent Application Ser. No. 60/795,618 filed Apr. 27, 2006, the disclosure of which applications is hereby incorporated herein by reference.

FIELD OF THE INVENTION

The present invention relates to fill level measuring. In particular the present invention relates to a planar antenna with a process separation device for a fill level radar, to a fill level radar with a planar antenna, and to the use of such a planar antenna for fill level measuring.

BACKGROUND INFORMATION

In fill level measuring technology there are numerous applications in which a high temperature or a high pressure is present. The process temperature may, for example, be up to 400° C. The pressure can have a value of up to 160 bar or more.

To make it possible in these applications to read the fill level with radar sensors, the process connections, in other words the antennae, may have to be constructed such that they withstand this temperature or this pressure without suffering any damage. To this effect, materials such as ceramics, glass or special steel are usually used.

Plastics that are used in known sensors as antenna fillings or seals are above all unable to withstand the high temperatures. These plastics are, for example, polytetrafluoroethylene (PTFE) or polyester ester ketone (PEEK).

If these plastics are to be replaced by ceramics or glass, then due to the high relative permittivities $\in_r$ of the ceramics and of the glass this may not be achieved without further ado especially in the case of higher transmission frequencies of the radar sensor.

On the one hand the dimensions will be very small, and on the other hand the high-frequency behaviour is negatively affected by the large difference between $\in_r$ and the surrounding air.

Figure 1:
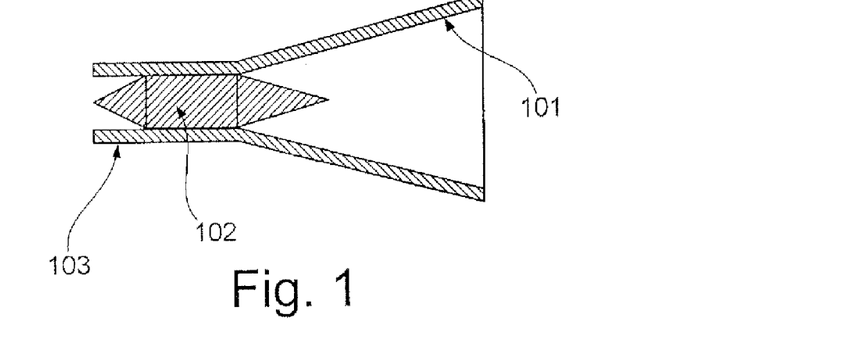
FIG. 1 shows a diagrammatic view of a horn antenna with an adaptor cone made of a dielectric material.

At frequencies around 6 GHz this may already cause problems and may significantly reduce the sensitivity of a sensor in particular at short range. FIG. 1 shows such a sensor.

Figure 2:
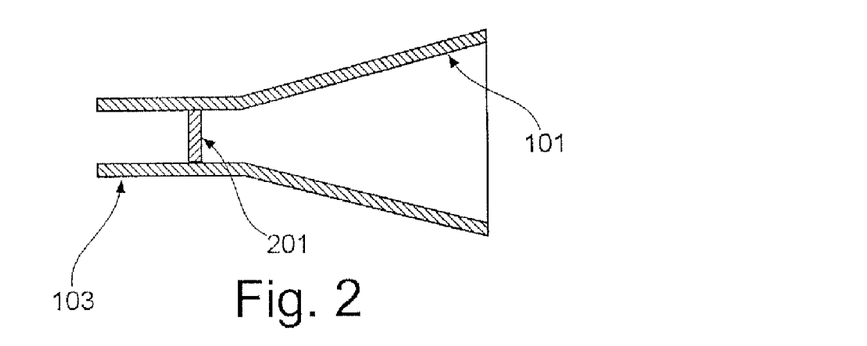
FIG. 2 shows a diagrammatic view of a horn antenna with a window made of a dielectric material.

A further option of process separation consists of the use of a ceramic plate as a window in a hollow conductor. In this arrangement a plate with a thickness that corresponds to half the wavelength of the transmission frequency (or integral multiples thereof) is inserted as a "window" into the hollow conductor. This is shown in FIG. 2. However, the reflection resulting from the high $\in_r$ of the plate is so high that in this arrangement too the sensitivity at short range can be significantly reduced by multiple reflections.

SUMMARY OF THE INVENTION

According to an exemplary embodiment of the present invention a planar antenna with process separation for a fill level radar for measuring a fill level is stated, wherein the planar antenna comprises a planar radiator element for radiating an electromagnetic transmission signal to an exterior region of the antenna that faces a filling material, and a plate-shaped process separation device for separating the exterior region of the antenna from an interior region of the antenna that faces away from the filling material, wherein the plate-shaped process separation device is arranged between the planar radiator element and the exterior region.

The planar radiator element may thus be situated on the (inside) rear of the plate-shaped process separation device, and may thus radiate the transmission signal through the process separation device into the exterior region of the antenna. Since the radiator element is thus located in the interior of the antenna, which as a result of the process separation device is sealed off from the exterior, good resistance to chemicals may be achieved, as may be improved high-frequency characteristics of the antenna.

According to a further exemplary embodiment of the present invention, the process separation device is a ceramic plate or a glass plate.

Both ceramics and glass may withstand high temperatures and pressures without being damaged by them.

The planar radiator element may, for example, be designed in the form of textured metallisation on the rear of the plate-shaped process separation device.

According to a further exemplary embodiment of the present invention, the planar antenna further comprises a metal wall as a mass surface for the planar radiator element, wherein the metal wall is arranged at a distance from the planar radiator element.

According to a further exemplary embodiment of the present invention, there is a gas or a vacuum between the metal wall and the process separation device.

By using a medium in the region between the metal wall and the process separation device, which medium has a low relative permittivity (or by the use of a vacuum), a maximum bandwidth of the antenna may be achieved.

According to a further exemplary embodiment of the present invention, the process separation device has a thickness which corresponds to an integral multiple of half the wavelength of the electromagnetic transmission signal.

In this way it may be possible to reduce loss of, or interference with, the transmission signal, which loss or interference results from the process separation device.

According to a further exemplary embodiment of the present invention, the planar antenna further comprises a circumferential rim in the interior region of the antenna to provide support to the process separation device against pressure from the exterior.

For example, the antenna comprises a housing and several sealing rings that provide a seal between the circumferential rim of the process separation device and the housing. In this way an antenna arrangement may be provided which is simple to produce and yet is nonetheless very sturdy, which antenna arrangement may ensure process separation even in the case of very substantial differences in pressure.

According to a further exemplary embodiment of the present invention, the sealing rings are graphite rings. Graphite may particularly be suited to sealing the process separation device since graphite rings, due to their ability to be compressed, almost completely fill the gap between the components to be sealed, and moreover are also conductive and are thus able to also provide electrical connections. In the case of normal sealing rings made of elastomers, dielectrically filled spaces may arise which may impede the propagation of high frequency. Furthermore, graphite is extremely resistant to high temperatures and to a plurality of chemicals.

According to a further exemplary embodiment of the present invention, in each instance the width of the sealing rings corresponds to half the wavelength of the electromagnetic transmission signal.

This may result in the short circuit at the end of the stub which is formed from the surfaces of the graphite rings and of the housing, which surfaces face the process separation device, with a length of λ/2 (i.e. half the wavelength) being reflected to a quasi-short circuit at the lateral wall, so that the recess in the exterior wall may appear not to be there.

According to a further exemplary embodiment of the present invention, the circumferential rim in the interior region of the antenna is a metal ring, wherein the process separation device is melted, sintered or shrunk into the metal ring.

According to a further exemplary embodiment of the present invention, a conical projection at the plate-shaped process separation device is provided so as to favour the dropping off of a liquid.

In this way soiling of the exterior region of the process separation device may be reduced.

According to a further exemplary embodiment of the present invention, the planar antenna further comprises a high-frequency connection to a microwave module, wherein the high-frequency connection is designed as a coaxial input.

For example, the coaxial connection may comprise a melted-in glass seal that represents safe zone separation in a potentially explosive area.

According to a further exemplary embodiment of the present invention, the high-frequency connection is designed as a coupling with a hollow conductor.

In this way the individual radiator elements may be excited by way of the coupling with the hollow conductor.

According to a further exemplary embodiment of the present invention, at least one further planar radiator element is provided, which together with the first radiator element forms a patch antenna.

There are thus two planar radiator elements or a multitude of planar radiator elements which are arranged on the rear of the process separation device and which together generate the transmission signal.

All known shapes, such as a rectangle, triangle or circle, may be suitable as radiator elements.

According to a further exemplary embodiment of the present invention, the planar antenna comprises an antenna horn that is arranged in the exterior region of the planar antenna, wherein the planar radiator elements are electrically interconnected so that they form an array.

According to a further exemplary embodiment of the present invention, the planar antenna further comprises a hollow conductor which is arranged in the exterior region of the planar antenna, wherein the planar radiator elements and the hollow conductor interact such that when the planar antenna is in operation, coupling an electromagnetic transmission signal into the hollow conductor takes place.

For example an antenna may then again be connected to the hollow conductor.

According to a further exemplary embodiment of the present invention, a fill level radar for determining a fill level in a tank is stated, with the fill level radar comprising a planar antenna as described above.

Furthermore, the use of a planar antenna, as described above, for fill level measuring is stated.

BRIEF DESCRIPTION OF DRAWINGS

Below, with reference to the figures, preferred exemplary embodiments of the present invention are described.

The illustrations in the figures are diagrammatic and not to scale.

DETAILED DESCRIPTION

In the following description of the figures the same reference characters are used for identical or similar elements.

FIG. 1 shows a diagrammatic view of a horn antenna 101 with an adaptor cone 102 made of a dielectric material. In this arrangement the electromagnetic transmission signal is introduced into the horn antenna 101 by way of the hollow conductor 103 and the adaptor cone 102 and is then radiated to the feed material. If the adaptor cone from a dielectric material 102 is to be designed as a process separation device for high temperatures and high pressures, it has to comprise a corresponding temperature resistance and pressure resistance. It must thus not be made of plastic material as it would melt at elevated temperatures. However, if the adaptor cone 102 is made from temperature-resistant materials such as ceramics or glass, this can result in problems during signal transmission due to the high relative permittivity of the materials ceramics or glass. As a result of this the high-frequency behaviour may be impeded. Furthermore, the dimensions must be selected so as to be sufficiently small.

FIG. 2 shows a diagrammatic view of a horn antenna 101 with a hollow conductor 103 and a window 201 made of a dielectric material as a process separation device. Due to the high relative permittivity of the window 201 strong reflections arise so that the sensitivity of the antenna arrangement is very significantly reduced as a result of multiple reflections at short range.

Figure 3:
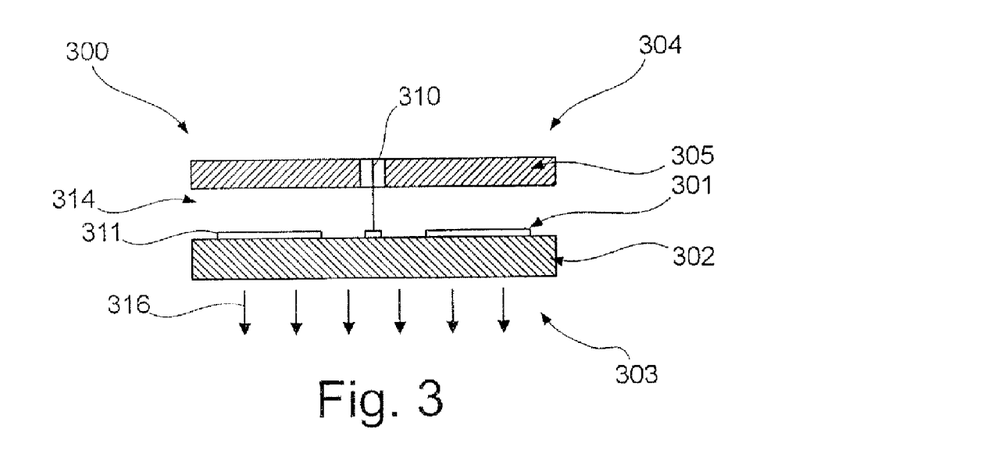
FIG. 3 shows a diagrammatic view of a planar antenna according to an exemplary embodiment of the present invention.

FIG. 3 shows a diagrammatic view of a planar antenna 300 according to an exemplary embodiment of the present invention. The planar antenna 300 comprises a ceramic plate 302 as a process separation device. On the rear of the ceramic plate 302 planar radiator elements 301, 311 in the form of textured metallisation have been formed. Furthermore a metal rear wall 305 is provided.

Thus a planar antenna structure 301, 311 has been formed on the ceramic- or glass plate 302. This structure comprises a conductive material and can be a single patch radiator 301 or an array comprising several individual patches 301, 311.

The radiator elements 301, 311 generate an electromagnetic transmission signal 316 of a wavelength λ, which transmission signal is radiated to the feed material by way of the plate 302.

For reasons of chemical resistance as well as for reasons of improved high-frequency characteristics, metallisation is on the side 304 facing away from the process.

A metal wall 305, arranged with some spacing, is used as a mass surface for the patch structure. Between the mass surface 305 and the structure 301, 311, on the ceramic plate 302 there is, for example, a gas (e.g. air) or a vacuum because as a result of the low relative permittivity of the gas or of the vacuum the bandwidth of the antenna 300 is at its maximum.

Furthermore, the use of dielectric materials in this intermediate region 314 (of higher relative permittivity) is possible. As a result of this the bandwidth may be reduced.

In order to minimise interference the thickness of the ceramic plate 302 is N×λ/2(N=1, 2, 3, 4 . . . ).

This design may provide some advantages, e.g. high resistance to temperature, high resistance to chemicals with the use of high-grade ceramics, and high resistance to pressure.

Figure 4:
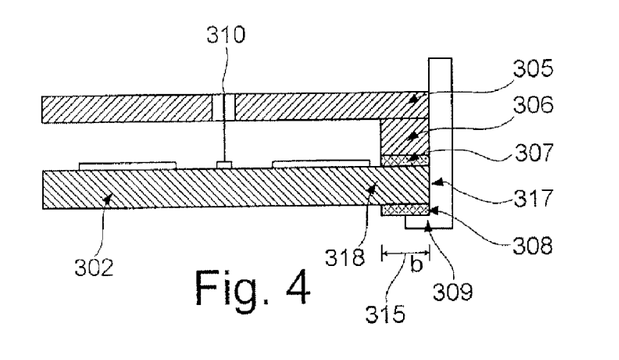
FIG. 4 shows a diagrammatic view of a planar antenna according to a further exemplary embodiment of the present invention.

FIG. 4 shows a diagrammatic view of a planar antenna with a support ring 306.

Supporting the plate 302 against pressure may be effected in various ways. The simplest version comprises a circumferential rim or a support ring 306 on the rear of the glass- or ceramic plate 302. This support ring 306 provides an annular support for the plate 302.

Providing a seal between this rim 306, the plate 302 and the housing 309 is effected, for example, with two graphite rings 307, 308, one being attached in front of and the other behind the plate 302. The force necessary for prestressing the graphite rings 307, 308 may be provided by a thread between the rear wall and the housing 309.

As far as the width b 315 of the graphite rings 307, 308 is concerned, for example half the wavelength λ of the frequency to be transmitted is selected. This results in the short circuit 317 at the end of the stub formed by the surfaces of the graphite rings, which surfaces face the ceramics, and of the housing 309, which stub is of a length b=λ/2, being reflected to a quasi short circuit 318 at the lateral wall, so that the recess in the exterior wall appears not to be present.

The following methods may provide further options of sealing the plate 302:

melting-in into a metal ring (e.g. in the case of glass);
sintering-in into a metal ring (e.g. in the case of ceramics); and
shrinking-in into a metal ring.

The component produced in this way may subsequently be welded for ex ample to further metal parts.

Figure 5:
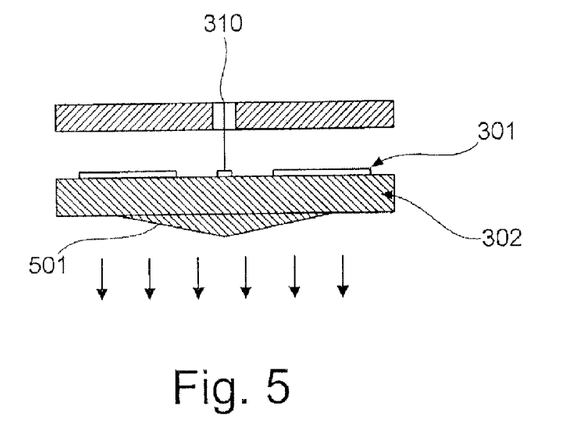
FIG. 5 shows a diagrammatic view of a planar antenna according to a further exemplary embodiment of the present invention.

FIG. 5 shows a diagrammatic view of a planar antenna according to a further exemplary embodiment of the present invention. In order to obtain better dropping-off behaviour on the glass- or ceramic plate 302, in addition the plate 302 can comprise a conical projection 501. If in this case condensate forms on the underside of the plate, then it may flow to the centre along the inclined surface and, when sufficient condensate has accumulated, it can drop off at that point.

Figure 10:
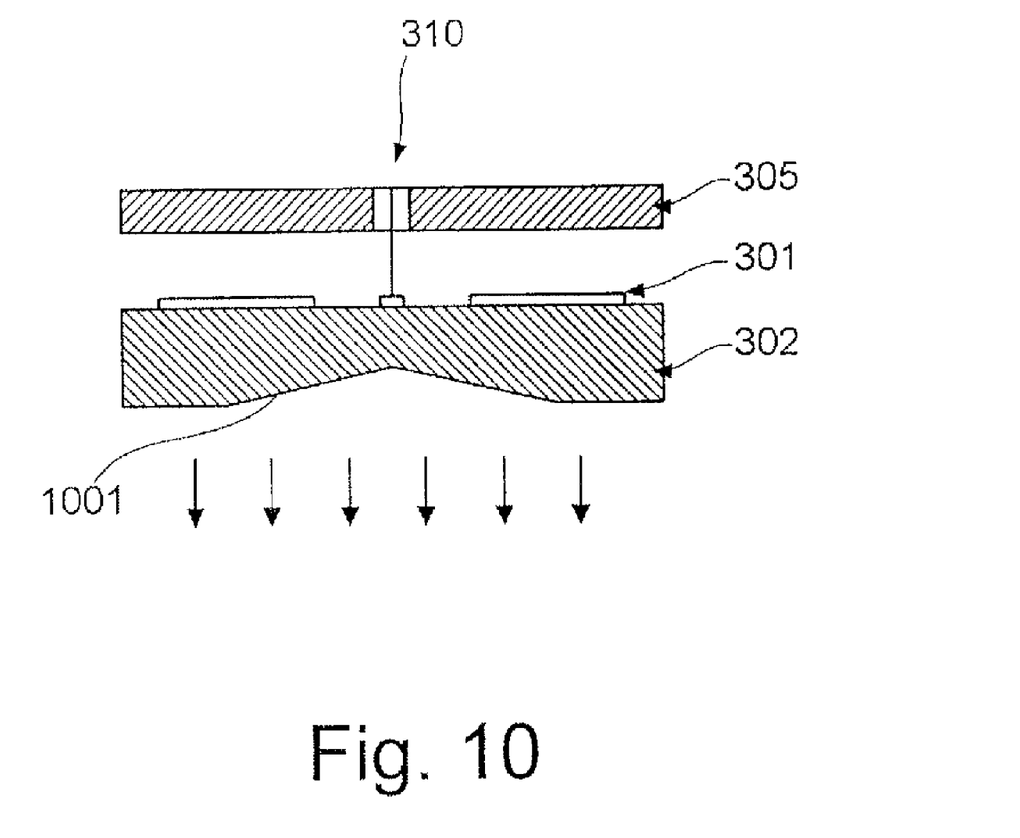
FIG. 10 shows a diagrammatic view of a planar antenna according to a further exemplary embodiment of the present invention with a conical recess 1001.

The conical projection 501 can also be designed the other way round so that the condensate collects at the outer ring. The ceramic plate 302 can also comprise a conical recess 1001 on the side facing the process, as a result of which recess 1001 the condensate may flow to the outer ring of the ceramic plate 302. This is shown in FIG. 10.

In the present exemplary embodiment the high-frequency connection to a microwave module (not shown in the figures) takes place by way of a coaxial input 310. This coaxial connection 310 may comprise a melted-in glass seal, which provides safe zone separation in a potentially explosive environment. To this effect a glass body, for example 3 mm in length, is melted in between the interior conductor and the exterior conductor.

As an alternative to the coaxial connection the individual radiator elements may also be excited by way of a coupling with a hollow conductor.

The structures on the glass- or ceramic plate 302 may be implemented either in thin-film technology or in a screen-printing process in thick-film technology.

From the above exemplary embodiment various options of implementing an antenna for fill level applications may be derived:

Pure Planar Antenna

In applications with exposure to high pressure, the purely planar design may be limited in size because the ceramic plate is to be kept as thin as possible in order to provide good radiation through said ceramic plate at high frequency. This design is in particular suited to applications in which either only little pressure is expected at high temperature, or in which a large opening angle i.e. small antenna gain is adequate. In this arrangement the design can be in accordance with the design shown in FIG. 4.

In this arrangement the structure on the ceramic plate comprises several individual radiator elements 301, 311, which together form a patch antenna. All the known forms such as a rectangle, triangle or circle are suitable as radiator elements. In particular rectangular radiator elements are used.

Excitation of a Horn Antenna

Figure 6:
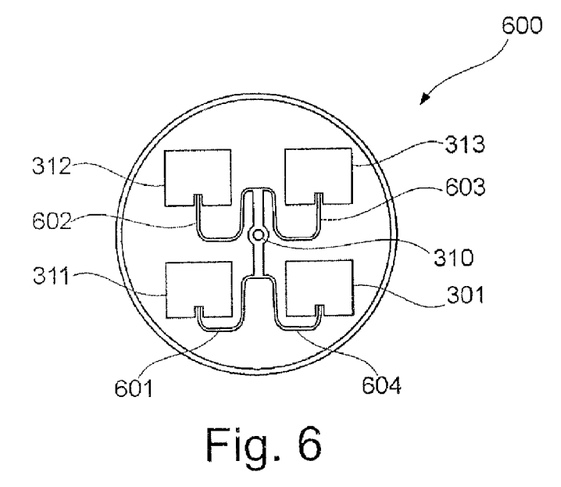
FIG. 6 shows a diagrammatic view of a radiator element array for a planar antenna according to a further exemplary embodiment of the present invention.

A further exemplary embodiment relates to the use of the planar antenna to excite a horn antenna. To this effect a small number of individual radiators 301, 311, 312, 313 are combined to form an array, as shown in FIG. 6. The individual arrays 301, 311, 312, 313 are connected to the high-frequency connection 310 by way of corresponding lines 601, 602, 603, 604. The entire array 600 is designed according to the information set out above.

Figure 7:
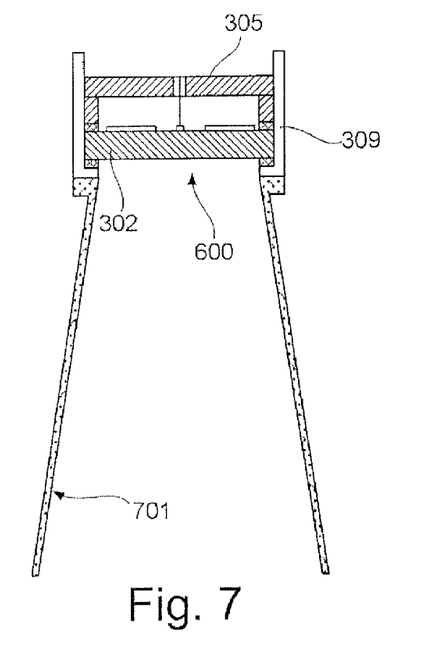
FIG. 7 shows a planar antenna with an antenna horn according to an exemplary embodiment of the present invention.

The arrangement 600 is then installed in a horn antenna 701 as shown in FIG. 7.

This arrangement may be associated with the fact in that the ceramic plate 302 can be kept relatively small and at an identical thickness may withstand higher pressure. Furthermore, by changing the horn size the antenna gain and the opening angle of the entire arrangement can be changed, wherein the coupling-in region with the patch antenna may always remain the same.

As an Exciter in a Hollow Conductor

Figure 8:
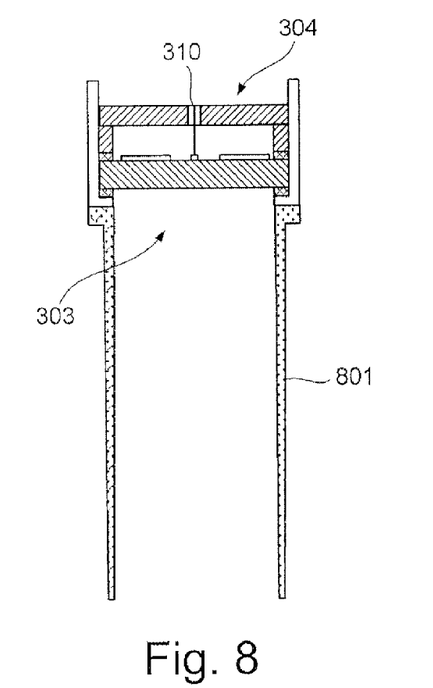
FIG. 8 shows a planar antenna with a hollow conductor according to an exemplary embodiment of the present invention.

The arrangement shown in FIG. 7 may also be installed in a hollow conductor 801 and thus serves as a transition from the coaxial line (high-frequency connection 310) to the hollow conductor 801. This is shown in FIG. 8. For example a horn antenna can then again be connected to the hollow conductor 801.

Figure 9:
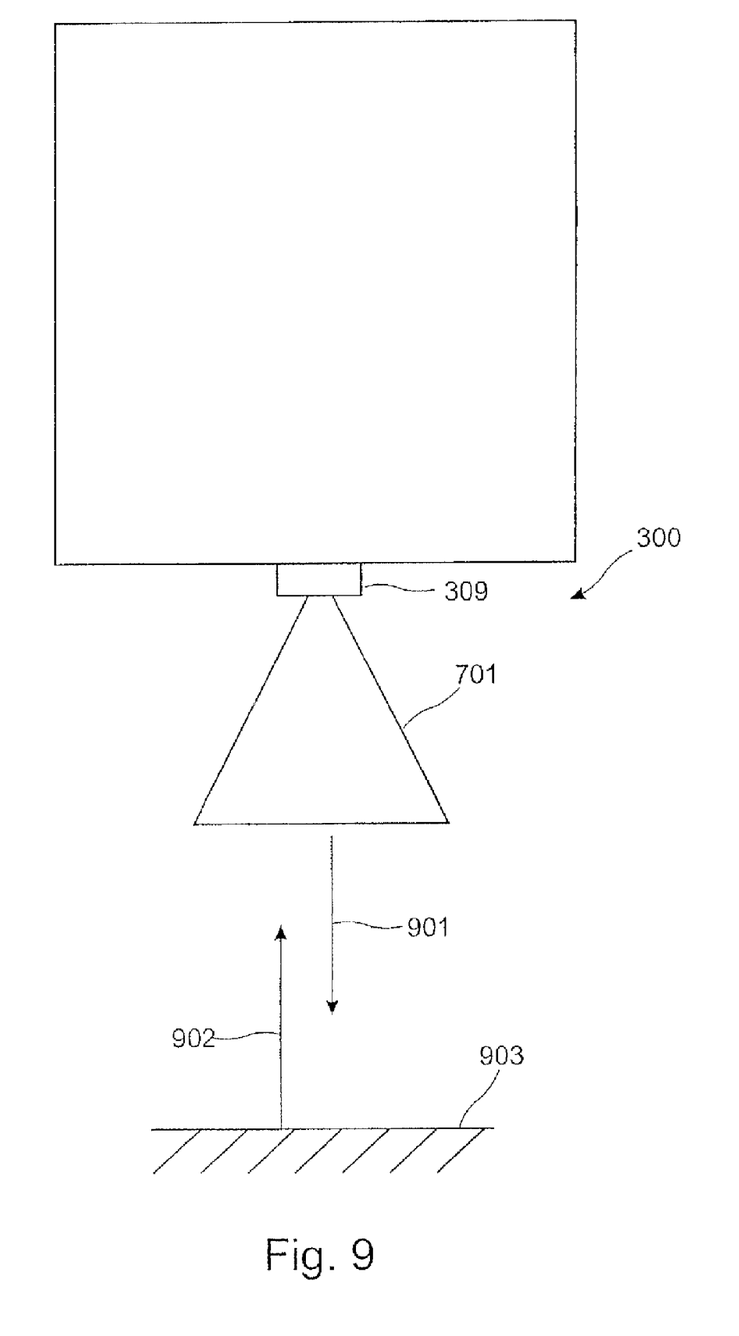
FIG. 9 shows a diagrammatic view of a fill level radar according to an exemplary embodiment of the present invention.

FIG. 9 shows a diagrammatic view of a fill level radar according to a further exemplary embodiment of the present invention.

In this arrangement the fill level radar comprises a planar antenna 300 with an antenna horn 701. The antenna 300 is designed to emit electromagnetic rays 901 to a fill level surface 903 and to receive electromagnetic rays 902 reflected on the feed material surface 903.

With a design of the antenna as a patch antenna with a ceramic plate as a cover, high temperature resistance of the entire antenna system and of the coupling-in device may be achieved with the use of materials such as ceramics, graphite, metals. Furthermore, good resistance to pressure of the ceramic- or glass plate may be ensured. Furthermore, good chemical resistance of the antenna and zone separation for explosion protection may be provided by a melted-in glass seal in the region of the coaxial lead-through.

Zone separation for explosion protection may also be provided by melting-in the front glass pane, on which the antenna structure has been affixed.

By way of addition, it must be noted that "encompassing" or "comprising" does not preclude any other elements or steps, and that "one" or "a" does not preclude a plurality. Further, let it be noted that features or steps described with reference to one of the above exemplary embodiments can also be used in combination with other features or steps from other exemplary embodiments described above. References in the claims are not be regarded as limiting.

What is claimed is:

1. A planar antenna for a fill level radar for measuring a fill level of a filling material, comprising:
   a planar radiator element radiating an electromagnetic transmission signal to an exterior region of the antenna facing the filling material;
   a plate-shaped process separation device separating the exterior region of the antenna from an interior region of the antenna facing away from the filling material;
   a circumferential rim located in an interior region of the antenna and providing support to the process separation device against pressure;
   a housing; and
   a first sealing ring and a second sealing ring providing a seal between the circumferential rim, the process separation device and the housing,
   wherein the process separation device is arranged between the planar radiator element and the exterior region.

2. The planar antenna of claim 1, wherein the process separation device is one of a ceramic plate and a glass plate.

3. The planar antenna of claim 1, further comprising: a metal wall being a mass
   surface for the planar radiator element; the metal wall being arranged at a distance from the planar radiator element.

4. The planar antenna of claim 1, wherein the process separation device has a thickness which corresponds to an integral multiple of half the wavelength of the electromagnetic transmission signal.

5. The planar antenna of claim 1, wherein the first and second sealing rings are graphite rings.

6. The planar antenna of claim 1, wherein in each instance, the width of the sealing rings corresponds to half the wavelength of the electromagnetic transmission signal.

7. The planar antenna of claim 1, wherein the circumferential rim in the interior region of the antenna is a metal ring and wherein the process separation device is one of melted, sintered and shrunk into the metal ring.

8. The planar antenna of claim 1, wherein a conical projection at the process separation device is provided so as to favour the dropping off of a liquid.

9. The planar antenna of claim 1, further comprising: a high-frequency connection connecting to a microwave module, wherein the high-frequency connection is designed as a coaxial input.

10. The planar antenna of claim 9, further comprising: a melted-in glass seal being provided in the high-frequency connection.

11. The planar antenna of claim 1, further comprising: a high-frequency connection connecting to a microwave module; wherein the high-frequency connection is designed as a coupling with a hollow conductor.

12. The planar antenna of claim 1, further comprising: at least one further planar radiator element which together with the first radiator element forms a patch antenna.

13. The planar antenna of claim 1, further comprising: an antenna horn arranged in the exterior region of the planar antenna, wherein the planar radiator elements are electrically interconnected to form an array.

14. The planar antenna of claim 1, further comprising: a hollow conductor arranged in the exterior region of the planar antenna, wherein the planar radiator elements and the hollow conductor interact such that when the planar antenna is in operation, coupling an electromagnetic transmission signal into the hollow conductor takes place.

15. The planar antenna of claim 1, wherein the planar radiator element is designed in the form of textured metallisation on the inside of the process separation device.

16. A planar antenna for a fill level radar for measuring a fill level of a filling material, comprising:
    a planar radiator element radiating an electromagnetic transmission signal to an exterior region of the antenna facing the filling material;
    a plate-shaped process separation device separating the exterior region of the antenna from an interior region of the antenna facing away from the filling material; and
    a metal wall being a mass surface for the planar radiator element, the metal wall being arranged at a distance from the planar radiator element,
    wherein the process separation device is arranged between the planar radiator element and the exterior region, and
    wherein there is a medium with a relative permittivity of one of a gas and a vacuum between the metal wall and the process separation device.

17. A fill level radar for determining a fill level of a filling material in a tank, comprising:
    a planar antenna including (a) a planar radiator element radiating an electromagnetic transmission signal to an exterior region of the antenna facing the filling material; (b) a plate-shaped process separation device separating the exterior region of the antenna from an interior region of the antenna facing away from the filling material; (c) a circumferential rim located in an interior region of the antenna and providing support to the process separation device against pressure; (d) a housing; and (e) a first sealing ring and a second sealing ring providing a seal between the circumferential rim, the process separation device and the housing,
    wherein the process separation device is arranged between the planar radiator element and the exterior region.

18. The use of a planar antenna for fill level measuring, the planar antenna including (a) a planar radiator element radiating an electromagnetic transmission signal to an exterior region of the antenna facing the filling material; (b) a plate-shaped process separation device separating the exterior region of the antenna from an interior region of the antenna facing away from the filling material; (c) a circumferential rim located in an interior region of the antenna and providing support to the process separation device against pressure; (d) a housing; and (e) a first sealing ring and a second sealing ring providing a seal between the circumferential rim, the process separation device and the housing, wherein the process separation device is arranged between the planar radiator element and the exterior region.

* * * * *